United States Patent [19]
Dunkel

[11] 3,822,400
[45] July 2, 1974

[54] SOLID STATE PULSE INITIATOR FOR DEMAND METER

[75] Inventor: William W. Dunkel, Seneca, S.C.

[73] Assignee: Sangamo Electric Company, Springfield, Ill.

[22] Filed: July 9, 1973

[21] Appl. No.: 377,619

[52] U.S. Cl............................. 324/103 R, 250/233
[51] Int. Cl........................ G01r 21/00, G01d 5/36
[58] Field of Search........ 324/103 R, 137, 142, 157; 250/233; 235/151.31

[56] References Cited
UNITED STATES PATENTS

| | | | |
|---|---|---|---|
| 3,114,081 | 12/1963 | Whipple | 250/233 X |
| 3,311,824 | 3/1967 | Pitt | 324/103 R |
| 3,348,067 | 10/1967 | Whipple et al. | 307/270 |
| 3,652,838 | 3/1972 | Dillon et al. | 235/151.31 |

Primary Examiner—Alfred E. Smith
Attorney, Agent, or Firm—Johnson, Dienner, Emrich, Verbeck & Wagner

[57] ABSTRACT

A solid state pulse initiator circuit for providing electrical impulses to operate a recorder in the storage of information relating to the comsumption of power as measured by an electric demand meter. Detector means sense meter disc movement and operate a memory between two stable states. Two output semiconductors which are alternately enabled by the memory are connected to three output conductors which may be selectively connected to a DC recorder with swinger high, a DC recorder with swinger low and an AC recorder. The pulse initiator circuit is referenced to the one of the output semiconductors which is conducting, and a high impedance is provided in both the source and return path of the base current for the nonconducting one of the semiconductors.

15 Claims, 6 Drawing Figures

SOLID STATE PULSE INITIATOR FOR DEMAND METER

BACKGROUND OF THE INVENTION

The present invention relates to a solid state pulse initiator for providing electrical impulses to electric devices, such as electrical demand meters.

Description of Prior Art. In the generation of power for their consumers, the utility companies must necessarily install generating and distribution equipment which is capable of supplying the maximum requirement of its customers in any given period of service. Obviously, the amount of power required at different times of the day and year will vary and depending upon the consumer applications, it is possible that the maximum demand in each day may occur for only a relatively small interval of time in such day. It is apparent that in such systems the transmission and generating equipment is being inefficiently utilized, and higher operating costs are experienced.

In an effort to encourage a more even distribution of the power demands by the customers, the utilities have requested and obtained the right to use a higher billing rate for larger commercial customers who use increased amounts of power (relative to their average load) during the period that the maximum demand periods are normally made of the system. Stated in another manner, the customer who is willing to adjust his periods of maximum power consumption to off-peak hours will be rewarded by a correspondingly lower electric bill.

To assist the utilities in determining and assessing an equitable charge for such type consumer, the meter manufacturers have developed demand meter equipment which provides records of both the peak power demands made by the consumer and the time at which such peak power demands are made.

In the more conventional types of demand meter equipment now commercially available, a so-called pulse initiator or impulse generator includes a detector circuit for sensing the rotations of the disc of a conventional watthour meter which is located at the customer location, and an impulse generator which is operated by the detector circuit to provide electrical signals which indicate the number of rotations of such disc. Since the number of rotations of the meter disc is proportional to the amount of power used by the customer, the impulse signals which are thus generated are also proportional to the amount of power consumed. The generated impulse signals are in turn transmitted to a recorder unit which records such signals along with appropriate time information on a magnetic or paper tape.

The detector means used in one type of impulse generator known in the art generally comprises a sensor device, such as a light source and an associated photoelectric cell which are located in juxtaposed relation with one another on opposite sides of the watthour meter disc. The disc includes one or more slots along he periphery thereof, and with rotation of the disc, such slot is moved into and out of registration with the juxtaposed light source and photoelectric cell. In the absence of the slot, the photoelectric cell outputs a first signal, and with the slot in registration with the photoelectric cell and light, the photoelectric cell generates a second signal.

The signal output of the photoelectric cell is fed to a mercury relay which in turn has a movable (swinger) armature which is operated between a first and second contact set in accordance with the signal output of the photoelectric cell. The terminals connected to the two contacts and swinger arm are used to connect the pulse initiator to associated recorder equipment. As will be shown, such recorder equipment includes an AC or DC power source (referred to hereinafter as AC and DC recorders respectively) which is connected to the three terminals of the pulse initiator for the purpose of providing representative signals to its associated recorder equipment for recording purposes whenever the signal output of the photoelectric cell (and therefore the position of the mercury relay) is changed.

Such pulse initiators as used in the field by the utility companies have not been entirely satisfactory. Fundamentally, the more serious shortcomings of such units are traceable to the mercury relay which is used in the pulse generator circuit. That is, it has been found that the relay contacts on the mercury relay tend to have limited life, and as a result frequent repair or replacement service is required. In addition, it has been found that the mechanical armature in its movement between contact positions in some cases fails to establish good contact, and in such event pulses may be lost which tend to disturb the integrity of the pulse information being recorded.

As a result of these and other shortcomings, the industry has developed solid state impulse generator devices which do not require a relay and its associated mechanical contacts for impulse generation. See for example U.S. Pat. Nos. 3,114,081, 3,311,824 and 3,348,067. While such devices represent a definite advance in the art, the use and application of such devices has been more limited than the earlier impulse generators which employed the mercury relays. That is, the recorder equipment commercially available in the field for use with pulse initiator devices are fundamentally of three basic types: (a) a recorder which has a DC power supply connected to a three-wire conductor input, and in which the center (swinger) terminal is connected to the positive terminal of the DC recorder power supply, and the other two terminals are connected over recorder loads to the negative terminal of the DC power supply; (b) a recorder which has a DC power supply connected to a three-wire conductor input, and in which the swinger terminal is connected to the negative terminal of the DC power supply, and the two other conductors are connected over recorder loads to the positive terminals of the DC power supply; (c) a recorder which has an AC power supply and a three-wire conductor input, and in which the center terminal is connected to one terminal of the AC power supply and the other two conductors are connected over recorder loads to the other terminal of the AC power supply.

The pulse initiator shown in U.S. Pat. No. 3,311,824 and one of the pulse initiators shown in U.S. Pat. No. 3,348,067, for example, are therefore restricted to use with a recorder which has an AC power supply. A further embodiment of the pulse initiator shown in U.S. Pat. No. 3,348,067 is adapted for use with DC recorders; however, none of the disclosed units are operable with all three types of recorders which are commercially available on the market.

Since the pulse initiator which uses a mercury relay may be used with all three types of recorders, it has not been necessary heretofore for the utility company to select a particular type of recorder for use with a specific type of pulse initiator. If pulse initiator devices which are limited in use to only one type of recorder are now introduced commercially, it is apparent that the utility companies will now necessarily restrict the types of recorders purchased to the type which may be used with the particular pulse initiator which is purchased (or vice versa). Since the existing utility companies presumably have different types of recorders in stock, it may be necessary to discard certain of the units in inventory, or purchase the several different types of pulse initiators which will work with the recorders in stock. Further, in those systems which use three different types of pulse initiators and three different types of recorder units, there is a continual possibility that the installer will, from time to time, connect the wrong type of recorder unit to a group of pulse initiators and the consequent danger of loss of important billing information.

SUMMARY OF THE INVENTION

The present invention is directed to a solid state pulse initiator circuit which is capable of use with each of the three different types of recorder circuits which are commercially available.

The novel unit basically comprises a power supply circuit in which a first output voltage is derived from a meter unit, and a detector means, which senses the energy measured by the meter, operates associated memory means between two stable states. A first signal circuit controlled by the memory means is connected to operate a first output semiconductor between a conducting and nonconducting state, and to provide a high impedance to the first output semiconductor in its nonconducting state. The second signal circuit connected to the memory means controls a second output semiconductor in like manner. A three-wire conductor circuit is provided for connecting the first and second output semiconductors to the power supply of the recorder used with the unit (i.e., an AC recorder, a DC recorder with swinger positive or a DC recorder with swinger negative). Each output semiconductor, as operated, completes an energizing circuit from the recorder circuit over predetermined ones of the three wire conductors to the recorder loads. According to the invention the low side of the pulse initiator power supply and the memory circuit are referenced to the operated one of the output semiconductors which is in turn referenced to the voltage of the recorder power supply. Stated in another manner, the pulse initiator power supply and memory circuit are not grounded but are referenced instead to the voltage of the one of the output semiconductors which is conducting. The novel circuit further provides a high impedance in both the source path and return path for the base current of the one of the semiconductors which is not conducting.

GENERAL DESCRIPTION

Figure 1:
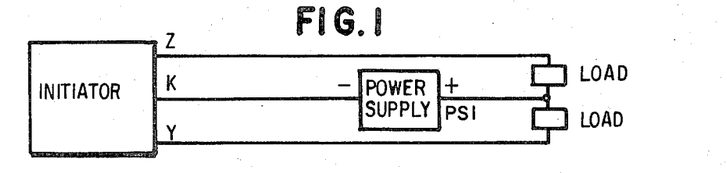
FIGS. 1–3 are block diagrams of three different types of recorder systems in which the novel pulse initiator device may be utilized.
Figure 2:
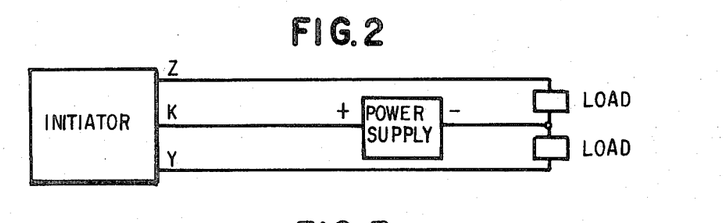
Figure 3:
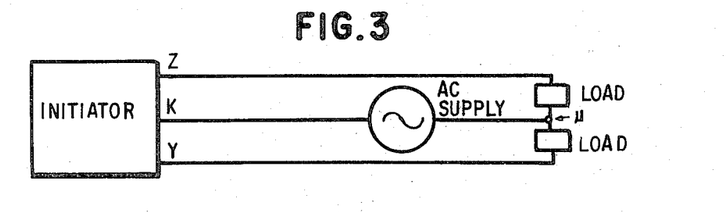

With reference to FIGS. 1–3, there is shown thereat various types of recording systems which may be used with demand meters to provide utility companies with the desired demand and time information.

The system of FIG. 1 includes a pulse initiator which is connected over three output terminals Y, K, Z, to the three wire output of a DC recorder. Such recorder includes a DC power supply having its negative or low side connected to the center terminal K of the pulse initiator and its positive or high side connected over a first load (usually a solenoid or magnetic recording head) to terminal Z of the pulse initiator and over a second load to terminal Y of the pulse initiator.

A second system shown in FIG. 2 comprises a recorder having a DC power supply with the positive or high side connected to the center terminal K of the pulse initiator and its negative or low side connected over a first load to terminal Z and over a second load to terminal Y of the pulse initiator.

With reference to FIG. 3, a third system shown comprises a recorder having an AC power supply in which one output is connected to terminal K and the second side is connected over a first load to terminal Z and over a second load to terminal Y. As was noted above, the novel pulse initiator of the present disclosure is operable with any of the systems disclosed in FIGS. 1–3. The operation and structure of the novel pulse initiator is now set forth in more detail.

SPECIFIC DESCRIPTION

Figure 4:
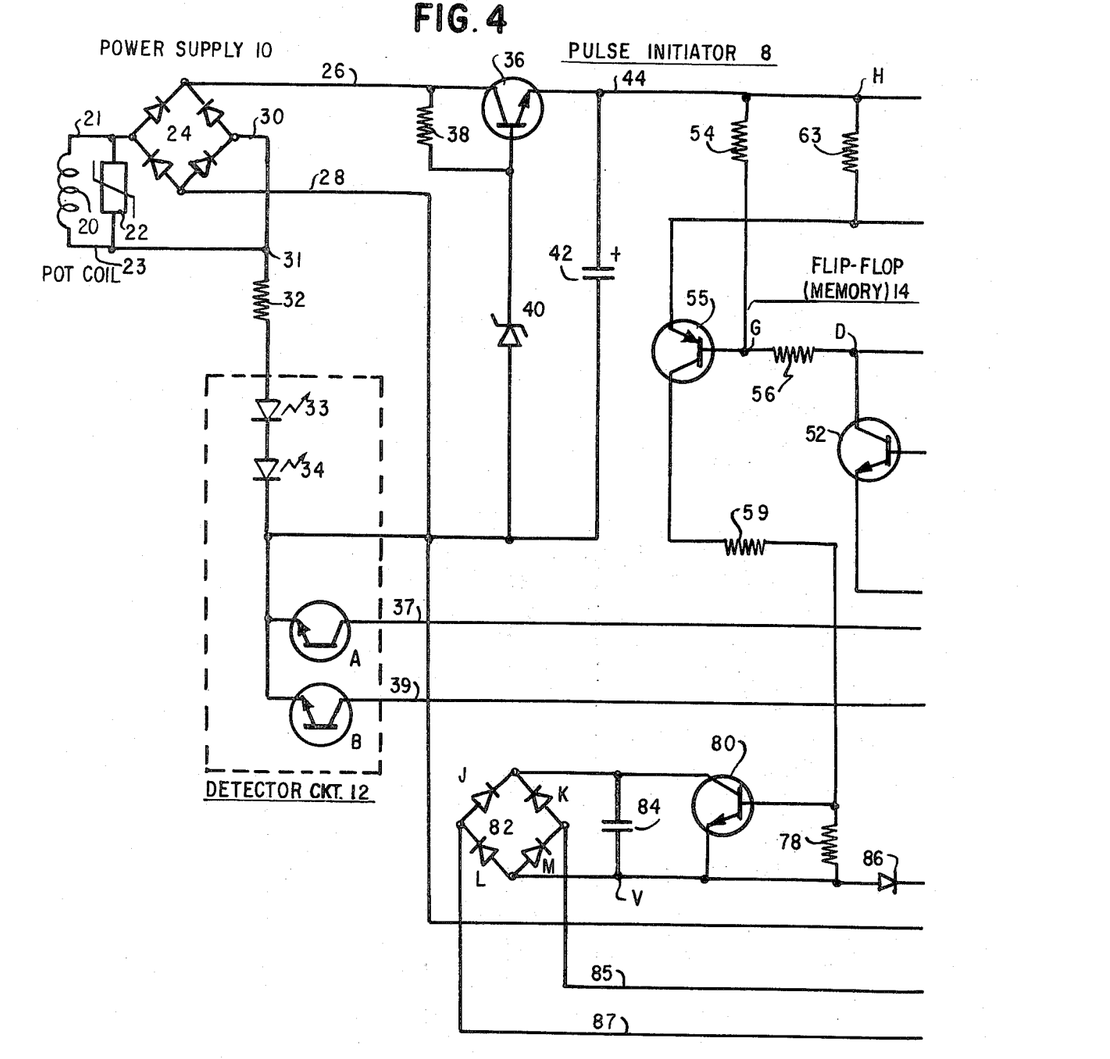
FIGS. 4 and 5 are circuit drawings of the novel pulse initiator of the invention.
Figure 5:
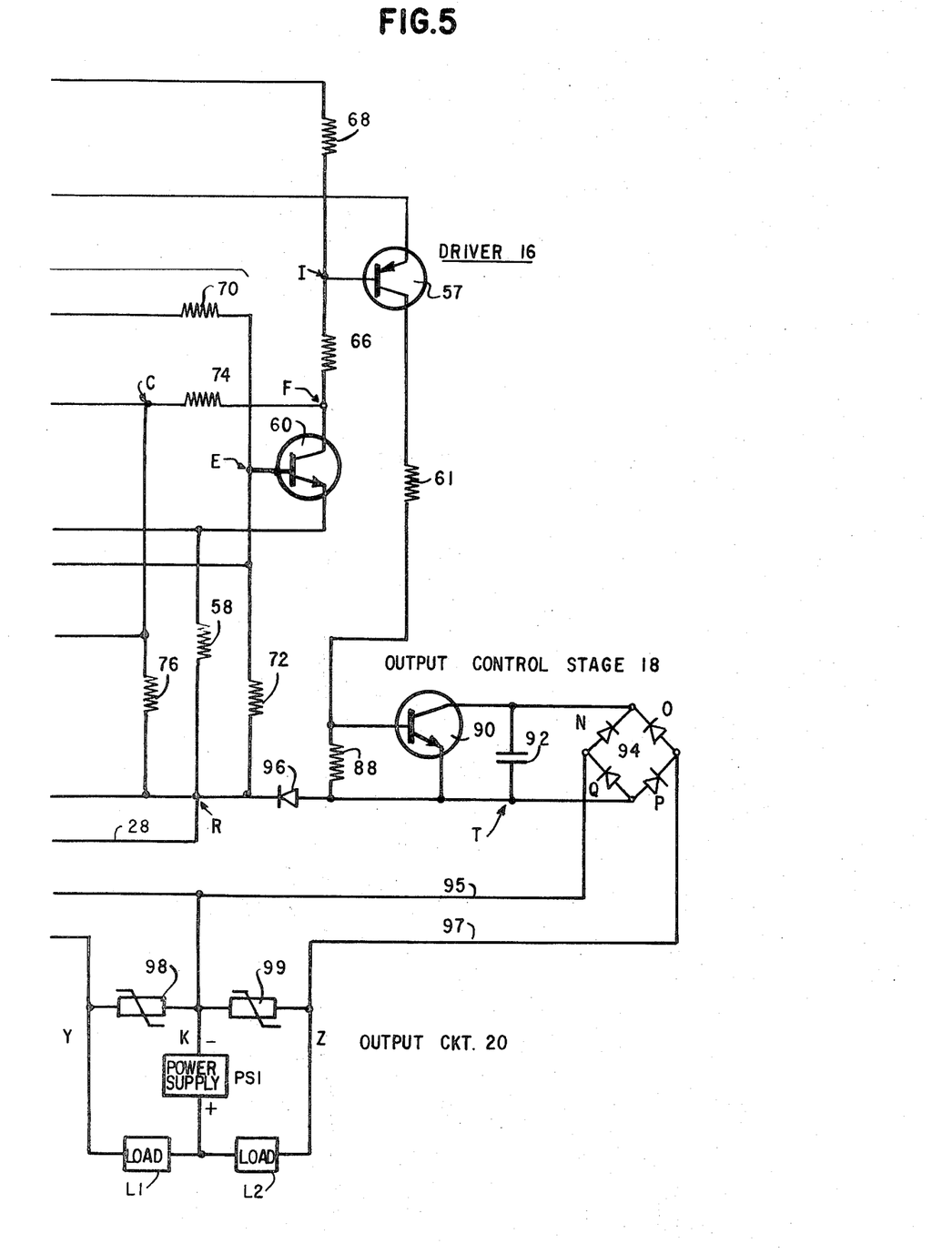

With reference to FIGS. 4 and 5, the pulse initiator 8 of the invention is shown to comprise a power supply 10, a detector circuit 12, a memory circuit 14, driver circuit 16, and an output control stage 18 connected to a three terminal output Y, K, Z. In the embodiment shown in FIGS. 4 and 5 a DC recorder circuit of the type disclosed in FIG. 1 has its three wire output connected to the output terminals Y, K, Z of the pulse initiator.

Power Supply 10

Power supply 10 includes a potential winding 20, a full wave rectifier bridge 24, resistors 32, 38, transistor 36, Zener diode 40 and capacitor 42. Potential winding 20 in one embodiment was wound as a secondary winding on the potential coil of the meter with which the pulse initiator is used. In such embodiment, the potential winding comprises 240 turns of No. 38 wire which provides a 10 volt AC output over conductors 21, 23 to the input terminals of full wave bridge rectifier 24 and over resistor 32 to detector circuit 12. The output terminals of full wave bridge rectifier 24 are connected over conductors 26, 28 and Zener diode 40 to the collector-base circuit of transistor 36 which is connected as an emitter-follower. Resistor 38 is connected across the base-collector circuit of transistor 36 for bias purposes, and the 6.2 volt Zener diode 40 is connected in the base cicuit of transistor 36 for voltage reference purposes. Capacitor 42 is connected across the base-emitter circuit of transistor 36 to reduce the ripple voltage which may appear on the power supply line.

As will be shown, reference conductor 28 is connected between one of the terminals of bridge rectifier 24 and reference point R in the circuit (rather than ground) to provide a novel circuit operation.

Detector Circuit 12

Detector circuit 12 which is connected over resistor 32 and diode bridge 24 to the half rectified 10 volt output of potential winding 20 includes a pair of series connected light-emitting diodes 33, 34 and a pair of parallel connected photoelectric cells A, B. More specifically, light-emitting diodes 33, 34 are arranged to be energized by a circuit which extends from the lower side of the potential winding 20 over conductor 23, conductor 31, resistance 32, series connected light-emitting diodes 33, 34, reference conductor 28, the lower left-hand diode of bridge rectifier 24 and conductor 21 to the upper side of potential winding 20. Phototransistors A and B each have their emitters connected to the energizing circuit for diodes 33, 34, and their collectors connected over conductors 37, 39 respectively to the control inputs for the operating switches in flip-flop memory circuit 14 as described hereinafter.

Figure 6:
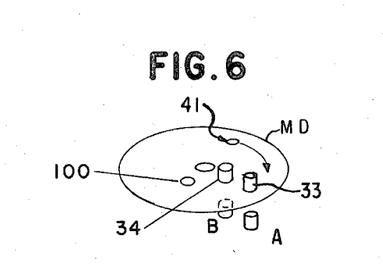
FIG. 6 is a diagrammatic sketch of the sensor unit which provides signals to the pulse initiator which indicate the rotations of the watthour meter.

With reference to FIG. 6, light-emitting diodes 33, 34 and phototransistors A, B, are schematically shown in operating relation with the meter shutter disc MD (referred to hereinafter as a meter disc) which is geared to a conventional watthour meter. As there shown, rotating meter disc MD locates at least two apertures, such as 41, 100, these holes being at a different radius from the center axes of the meter disc MD. The first light-emitting diode 33 and phototransistor A are arranged in juxtaposed position with one another on opposite sides of the meter disc MD and along the path of travel of the aperture 41. In a similar manner the light-emitting diode 34 and the phototransistor B are arranged in juxtaposed position on opposite sides of the meter disc MD and along the path of travel of the aperture 100. While only two apertures 41 and 100 are shown, meter disc MD may include a number of pairs of apertures, such as 41, 100, located in spaced relation to one another so as to successively operate elements 33, A; 34, B a number of times in each rotation of the meter disc MD.

With the meter disc MD in the illustrated position, the solid portion of the meter disc MD will normally block passage of the light output of light-emitting diodes 33, 34 from their associated phototransistors A, B respectively. However, with rotation of the meter disc to move the aperture 41 into registration with the light-emitting diode 33 and photoelectric cell A, the light output from light-emitting diode 33 will strike the associated phototransistor A to cause the resistance of the phototransistor A to decrease sharply and provide a corresponding increase in the current output over conductor 37 (FIG. 4). The current output from photoelectric cell B remains at the low level, however, since the meter disc MD continues to block the light output of light-emitting diode 34 from associated phototransistor B. With continued movement of the meter disc MD, aperture 41 is moved out of registration with the light-emitting diode 33 and phototransistor A, and the current output over conductor 37 decreases to its previous level (i.e., the level of current output from photoelectric cell B at this time).

With continued rotation of the meter disc, aperture 100 is brought into registration with light-emitting diode 34 and phototransistor B, whereby the resistance of phototransistor B is decreased substantially and the current flow over conductor 39 (FIG. 4) is increased. Since the output of light-emitting diode 33 is still blocked from phototransistor A by the solid portion of meter disc MD the current output on conductor 37 will remain at the low level. With continued movement of meter disc MD, aperture 100 moves out of registration with elements 34, B and the current output of phototransistor B returns to the low level.

The use of two phototransistors A, B in such circuit configuration eliminates the possibility of effecting a change in the state of the memory 14 in response to minor displacement of the disc. That is, as is well known, the meter disc MD is geared to the watthour meter disc and from time to time a slight backup motion can occur. However, with the disclosed arrangement, once phototransistor A has been energized, and the meter disc MD advances to move aperture 41 out of registration with elements 33, A and into a dead area in which neither phototransistor is enabled, even if meter disc MD should back up to cause light to restrike phototransistor A, the memory 14 will not change state. Stated in another manner, once the phototransistor A has been enabled by reason of the light input from its associated diode 33, it can be struck by light any number of times without effecting a change in the state of the memory 14. Such change will occur only at such time as the phototransistor B is enabled by the output from its light-emitting diode 34 as paerture 100 moves into registration therewith.

Memory Circuit 14

Flip-flop memory 14 comprises a first transistor 52 and a second transistor 60 connected in a flip-flop configuration to operate between a first and second state by the signal output of photo-transistors A and B. With each change of state of memory 14, driver transistors 55, 57 are switched to provide output signals to output control stage 18.

The first memory transistor 52 includes a collector connected (a) over resistors 54, 56 to the positive potential conductor 44 of power supply 10, (b) over resistor 70 to the base of second memory transistor 60, and (c) over resistor 56 to the base element of driver transistor 55; an emitter connected over resistor 58 to reference point R and a base connected (a) over resistor 76 to reference point R, (b) over conductor 39 to the output of the phototransistor B, and (c) over resistor 74 to the collector of second memory transistor 60.

The second memory transistor 60 includes a collector connected (a) over resistors 66 and 68 to the positive potential of conductor 44 of power supply 10, and (b) over resistor 66 to the base of transistor driver 57 and (c) over resistor 74 to the base of first memory transistor 52; an emitter element connected over common resistor 58 to reference potential at point R, and a base element connected (a) over resistor 70 to the collector output of the first memory transistor 52, (b) over resistor 72 to the reference point R and (c) over conductor 37 to the output of phototransistor A.

The memory section 14, as noted above, is a flip-flop circuit which as operated to a given state by one of the phototransistors A, B, will maintain such state until the other of the phototransistors A, B is enabled. Assuming that phototransistor A was first enabled by reason of the passage of the aperture 41 between the light-emitting diode 33 and phototransistor A, the first memory transistor 52 will be conducting and current will be flowing over resistors 54 and 56, transistor 52 and resistor 58 to the reference potential at point R (to be described), conductor 28 and the low side of power supply 10. With the first memory transistor 52 conducting, (and maintained in such condition by base current which flows over resistors 68, 66, 74 and 76), driver transistor 55 will be operated and maintained in the conducting condition to provide current flow over a path which extends from the positive potential on conductor 44 over resistor 63, driver transistor 55, resistors 59, 78, and diode 86 to reference point R, conductor 28 and the low side of power supply 10.

With the first memory transistor 52 conducting, the second memory transistor 60 is off and drive transistor 57 is also off. That is, the value of resistors 70 and 72 and emitter resistor 58 are selected so that with the first memory transistor 52 in the conducting condition, the second memory transistor 60 will be held in the off condition.

With rotation of the meter disc MD to move aperture 100 into registration with the phototransistor B and light-emitting diode 34, the light output from light-emitting diode 34 which passes through aperture 100 causes the resistance of phototransistor B to decrease, and an increased current flow occurs over the path which extends from the positive potential on conductor 44 over resistors 68, 66 and 74 and parallel paths including phototransistor B and resistance 76 respectively. With increased current flow over such path, the voltage at the base of the first memory transistor 52 (point C) is lowered and transistor 52 turns off.

As the first memory transistor 52 turns off, the current flow over resistors 54, 56 decreases, and the voltage at the collector of transistor 52 (point D) increases. Since resistors 70 and 72 form a voltage divider between the collector of transistor 52 and the common reference point R, the voltage at the base of the second memory transistor 60 (point E) accordingly increases and the second memory transistor 60 turns on. Current now flows over resistors 68, 66, transistor 60 and resistor 58 to the reference point R. As will be described in more detail hereinafter, current will also flow from the base of transistor 57 over resistor 66, transistor 60, and resistor 58 to the reference point R.

With continued rotation of the meter disc MD and the movement of the aperture 100 out of registration with light-emitting diode 34 and phototransistor B, the resistance of phototransistor B will increase significantly and the current output over conductor 39 from the base of transistor 52 decreases. Memory flip-flop 14, however, will not change state (even if the meter disc MD should inadvertently cause phototransistor B to vary between the high and low resistance state), since the flip-flop circuit 14 will only change state if phototransistor A once again lowers its resistance by reason of light striking the phototransistor.

At such time, as the aperture 41 once more is moved into a position to pass light from associated light-emitting diode 33 to phototransistor A, the resistance of phototransistor A is lowered and an increased amount of current flows over the circuit described above to lower the voltage at the base of the second memory transistor 60 (point E). With reduced base voltage, transistor 60 turns off, and reduced current flows over the path which extends from positive potential on conductor 44 over resistors 68, 66 and transistor 60 and resistor 58. As the current decreases sufficiently the voltage at the collector of transistor 60 (point F) increases, and the voltage divider comprised of resistors 74, 76 causes the voltage at the base of the first memory transistor 52 (point C) to increase, whereby transistor 52 will be returned to the conducting condition. Thus the memory circuit 14 changes state with the receipt of each signal which indicates the detection of aperture 41 by elements 33, A and aperture 100 by 34, B, but only if such signals are received alternately from elements 33, A and 34, B.

Driver Stage 16

Driver stage 16 comprises a first and a second transistor 55, 57 which are controlled by the outputs of memory circuit 14. As noted above, when the first memory transistor 52 is conducting, the voltage at the collector of transistor 52 (point D) is significantly lower than the voltage at such point when transistor 52 is off. Resistors 54 and 56 comprise a voltage divider connected between the positive potential on conductor 44 (point H) and the collector of transistor 52, and as a result, when transistor 52 is conducting, and the voltage at the base of driver transistor 55 (point G) is also at a lower voltage, transistor 55 will be turned on. Conversely, when the transistor 52 is turned off, the voltage at the base of driver transistor 55 is at its higher value and transistor 55 will be turned off. Such mode of operation is determined by selecting the proper values for resistances 54, 56, 59 and 63.

Since resistors 66, 68 provide a voltage divider which is connected between the positive potential of conductor 44 and the collector of transistor 60 (point F), it is apparent that as the voltage at the collector of transistor 60 (point F) rises, the voltage at the base of transistor 57 will also rise, and when the voltage at the collector of transistor 60 decreases, the voltage at the base of driver transistor 57 decreases. The values of resistors 68, 66 and 63, 61 are selected so that driver transistor 57 will be on when the base of transistor 57 is at the lower voltage, and driver transistor 57 will be off when its base is at a higher voltage.

In brief summary, when the second memory transistor 60 is conducting the driver transistor 57 will also be conducting, and when the second memory transistor 60 is off the driver transistor 57 will be off. In like manner, when the first memory transistor 52 is conducting, its associated driver transistor 55 will be conducting, and when the first memory transistor 52 is off, the associated driver transistor 55 will be off.

Output Control Stage 18

Output control stage 18 which is connected to the outputs of driver stage 16 has a first section which includes first switching transistor 80 having its base element connected over resistor 59 to the collector output of driver transistor 55 and over resistor 78 to its emitter circuit. The collector-emitter circuit of switching transistor 80 is connected to two terminals of a full wave bridge rectifier 82 and capacitor 84 is connected across such circuit for filtering purposes. The emitter of transistor 80 is also connected over diode 86 to reference point R. The output terminals of full wave rectifier 82 are connected over conductors 85, 87, respectively, to conductors Y and K of output circuit 20.

Output control stage 18 has a second section, including a second transistor 90 having a base element connected in like manner over resistor 61 to the collector output of driver 57, and also over resistor 88 and diode 96 to the reference potential at point R. The emitter-collector circuit of transistor 90 is connected to a first set of terminals of full wave rectifier bridge 94, and capacitor 92 is connected across such circut for filtering purposes. The emitter of transistor 90 is further connected over diode 96 to the reference point R. The second set of terminals of full wave rectifier 94 are connected via conductors 95, 97, respectively, to the Z and K output conductors of output circuit 20.

Voltage variable resistor 98 is connected across conductors Y, K and voltage variable resistor 99 is connected across conductors K, Z to protect the output circuit components against voltage transients.

As was noted above, the pulse initiator circuit 8 has the capability of being connected for operation with (a) a DC recorder having the low side of its power supply connected to the common terminal K, (b) a DC recorder having the high side of the power supply connected to the common terminal K (FIG. 2), and (c) an AC recorder having one side of the AC supply connected to the common conductor K and the other side connected to terminals Y, Z (FIG. 3).

Operation With DC Recorder—FIG. 1

It is initially assumed that the output circuit 20 of the pulse initiator 8 (FIGS. 4, 5) is connected to a DC recorder in the manner of FIGS. 1 and 5 wherein the low side (negative) of the power supply PS1 is connected to terminal K, and the high side is connected across a first load L1 to terminal Y and a second load L2 to terminal Z. Assuming for purposes of illustration that the first flip-flop transistor of memory 14 is conducting and that the driver transistor 55 associated therewith is turned on, current will be flowing from the positive power supply conductor 44 over resistor 63, transistor 55, resistor 59, resistor 78, and diode 86 to the reference potential at point R, and also over the base of transistor 80 in parallel with resistor 78 over diode 86 to the reference potential at point R and conductor 28 back to power supply 10. With the flow of current over the base-emitter circuit of transistor 80, the transistor 80 will conduct, and current will flow from the positive side of the power supply over load L1, terminal Y, conductor 87, diode J of bridge rectifier 82, transistor 80, diode M of bridge rectifier 82, conductor 85 and terminal K to the negative side of the power supply PS1. Transistor 90 in the output control stage 18 is off (i.e., second memory transistor 60 and driver transistor 57 are off).

For purposes of illustration it will be assumed that the high side of the power supply is at 70 volts and the low side is at zero volts. As switching transistor 80 conducts, point V will be at approximately .05 volts and point R will be at zero volts. As noted above, point R is connected via conductor 28 to one side of rectifier bridge 24 and as a result the voltage of the output terminals of bridge 24 will be the summated value of the 10 volts applied by the potential coil 20 to bridge rectifier 24 and the zero volts applied thereto over conductor 28 minus the drop across the bridge diodes (i.e., in the order of 10 volts). With driver transistor 55 conducting, such voltage regulated to approximately 5 volts by transistor 36 is applied to the base of transistor 80 which is accordingly held conductive. Since driver transistor 57 is off, a high impedance is provided for the base of transistor 90 and transistor 90 remains off.

The positive voltage of the recorder power supply also appears over load L2, conductor Z, conductor 97 and diode zero to the collector of transistor 90. With transistor 90 blocked, however, the voltage impressed on terminal Z by the recorder power supply will not result in any significant current flow over load L2 and terminal Z. Thus the memory circuit 14 and the power supply 10 are both referenced to the conducting one of the output transistors (i.e., transistor 80 in the present example).

Assuming now that the meter disc MD advances to bring the aperture 100 into registration with the light-emitting diode 34 and phototransistor B, the resultant signal on conductor 39 will cause first memory transistor 52 to turn off and second memory transistor 60 to turn on. With first memory transistor 52 turned off, driver transistor 55 turns off and transistor 80 turns off. With second memory transistor 60 turned on, driver transistor 57 conducts and transistor 90 is switched on.

With the transistor 80 turned off and transistor 90 turned on, current will flow from the positive terminal on the recorder power supply over terminal Z, conductor 97, diode 0, transistor 90, diode Q and conductor 95 and terminal K to the negative side of power supply PS1. With the emitter of transistor 90 connected over diode 96 to reference point R, the voltage at reference point R will be approximately zero volts as before. With driver transistor 55 and transistor 80 turned off, the positive potential of the recorder power supply which appears on conductor 87 will not result in any significant current flow over terminal Y.

Transistor 90 is maintained in the conducting condition by current flow over a path extending from the approximate 5 volts potential on conductor 44 over resistor 63, transistor 57, resistor 61, and the base emitter circuit of transistor 90 and diode 96 to the reference potential on conductor 28. Such condition exists until such time as a further impulse is output by the phototransistor A over conductor 37 to the base of the second memory transistor 60.

Again the power supply 10 and memory circuit 14 have been referenced to the output semiconductor which is in the conductive state (i.e., transistor 90) rather than to ground. In addition, the driver 55 and diode 86 present a high impedance to the output semiconductor 80 which is in the nonconducting state (i.e., in both the source and return line of the base conductor). In the illustrated arrangement, with the low side of the recorder power supply connected to terminal K of the output circuit 20 the circuit connections are such that the reference point R is also low.

Operation With DC Recorder—FIG. 2

With reference to FIG. 2, it will now be assumed that the high side of a power supply of a DC recorder is connected to terminal K of the output circuit 20 of pulse initiator 8. Assuming that the first memory transistor 52 is conducting and that the driver 55 is conducting, current will flow from the positive conductor 44 over resistor 63, transistor 55, resistance 59 and the base emitter circuit of emitter 80, diode 86 and conductor 28 to the negative conductor of power supply 10. At the same time, a current path will extend from the positive side of the power supply over terminal K, conductor 85, diode K of rectifier 82, transistor 80, diode L, conductor 87, terminal Y and the first recorder load to the negative side of the recorder power supply. It should be noted that the voltage at point R differs from the voltage at terminal K only by the small drop which occurs across diode K, transistor 80 and diode 86.

In the example set forth in FIG. 1 in which terminal K was connected to the negative side of the power supply PS1, the point R was low or ground. In the connection shown in the present example (FIG. 2) in which terminal K is high, the common point R of the pulse initiator is also high and remains high as the pulse initiator switches between alternative states (i.e., in one embodiment the positive potential of the recorder power supply was approximately 70 volts and the point R was therefore at approximately 68.5 volts).

With reference point R at approximately 68.5 volts, the positive potential on conductor 44 is approximately 73.5 volts (all the summated values of the potentials input to bridge 24 over conductor 28 and potential coil 20 minus diode drops in the bridge 24). Such potential (minus the drop across transistor 36, etc.,) also appears at the base of the conducting transistor 80. Since transistor 90 is off, the high voltage at terminal K (approximately 70 volts) is found on both sides of diode N and at the collector of transistor 90. However, transistor 90 is turned off and point T and diode P remain at the low voltage value. Diode 96 is back-biased to prevent an undesirable flow of current from point R over diode P to terminal Z.

Assuming now that a pulse signal is output by phototransistor B to the base of the first memory transistor 52, transistor 60 turns on and transistor 52 turns off. Driver transistor 55 and switching transistor 80 turn off and driver transistor 57 and switching transistor 90 conduct.

With transistor 90 conducting and transistor 80 off, a circuit is completed from positive side of the recorder power supply over terminal K, conductor 95, diode N, transistor 90 and diode P, conductor 97, terminal Z, load L2 to the negative side of the recorder power supply. Again, reference point R is at the approximate value of terminal K and the high voltage in the order of 73.5 volts on conductor 44 drives the current through the base of the conducting one of the output drive semiconductor 90. The circuitry remains in such state until such time as a subsequent pulse is output by phototransistor A over conductor 37 to change the state of the memory 14.

In the described arrangement in which the high side of the recorder power supply is connected to terminal K of the pulse initiator, the common reference point R for the power supply 10 and memory circuit 10 is at the high voltage (approximately 70 volts) and remains high as the pulse initiator operates to alternative states.

Operation of Pulse Initiator With Recorder Having AC Power Supply—FIG. 3

The novel pulse initiator may also be connected to a recorder having an AC power supply as shown in FIG. 3. It is first assumed that the pulse initiator 8 is connected as there shown and that the first memory transistor 52 and associated driver transistor 55 are on, and transistor 80 is conducting the alternating current output from the recorder AC power supply which appears at terminal K during the half cycle in which such output of the power supply is high. At such time current flows over a path which extends from terminal K over conductor 85, diode K, transistor 80, diode L, conductor 87, terminal Y and over the first load to the second terminal of the recorder power supply. Reference point R in the pulse initiator circuit 8 is at a lower voltage than point V by reason of the voltage drop over diode 86. Point V is in turn at a lower voltage than terminal K by reason of the voltage drop across diode K and the conducting transistor 80. Stated in another manner, the reference point R is essentially at the same voltage as terminal K (the difference being only that matter of the voltage drop over the diodes K, 86 and transistor 80), and the voltage at terminal R will vary with the voltage at terminal K.

With reference to the portion of the pulse initiator circuit connected across terminals K and Z, it will be apparent that the higher voltage at K appears over conductor 95, across diode N and at the collector of transistor 90. However, since transistor 90 is off, point T is at a voltage which is not much higher than terminal Z. Since reference point R is at the higher voltage, it will be apparent that diode 96 is reverse biassed and undesirable current flow from point R to point T is prevented.

In the second half cycle of the voltage the negative voltage appears at terminal K and the positive voltage occurs at terminals Y and Z. With switching transistor 80 in the conducting state, the current flow will be from the second terminal on the recorder AC power supply over the first load, terminal Y, conductor 87, diode J, transistor 80, diode M, conductor 85, and terminal K to the first terminal of the recorder power supply. The voltage at reference point R (common reference point for the pulse initiator circuit 8) is essentially the same as the voltage at terminal K and will vary with the voltage at terminal K. Since switching transistor 90 is turned off at this time the higher voltage at terminal Z which also appears over diode 0 and at the collector of transistor 90 will be blocked by transistor 90. Point T is therefore separated from the negative voltage at terminal K only by the forward drop across diode Q.

The operation of the circuit with switching of the memory 14 to effect turn-off of transistor 80 and turn-on of transistor 90 will be apparent from the foregoing description.

SUMMARY

As described above, the output terminals Y, K, Z, of the novel pulse initiator may be connected for operation with AC recorders, DC recorders with the low side of the recorder power supply connected to terminal K, and DC recorders with the high side of the recorder power supply connected to terminal K. It can be shown in like manner that the novel circuit will also operate properly with various modifications of such recorders, such as recorders which use a pulse DC or rectified AC output.

Such novel operation is basically achieved by reason of the fact that the voltage of the memory circuit 14 and power supply circuit 10 which provide the base current to the output transistors 80, 90, are always referenced to the voltage of the particular semiconductor in the output stage which is in the conducting condition (rather than to ground). In addition the novel circuit is arranged so that the voltage present at the one output semiconductor is not connected to the other of the output semiconductors.

The novel circuit is also designed so that the connections from the output semiconductors to the drive transistors 55, 57 present a high impedance to the one of the output semiconductors which is not conducting. The high impedance in both the source line and return line of the base current is unique (in conventional designs either the base current source or return line presents a low impedance).

I claim:

1. In a pulse initiator circuit for operating a controlled device having its own power supply to record information relating to power consumption measured by an electric meter comprising a potential source, detector means for providing signals which indicate the energy measured by said electric meter, an output circuit including first and second semiconductors, signal generating means connected to said detector means for alternately operating said first and second semiconductors to the conducting state, a common circuit reference point, means connecting said circuit reference point to said first and second semiconductors to be at the approximate voltage of the one of said first and second semiconductors which is in the conducting state, means connecting said circuit reference point to said potential source, means connecting said potential source to said signal generating means, means in said output circuit including a plurality of conductors for connecting said first and second semiconductors to said controlled device, one of said conductors being connected between one side of said power supply in said controlled device and both of said semiconductors, whereby the potential at said one side of said power supply is provided to said circuit reference point by the conducting one of said semiconductors.

2. A circuit as set forth in claim 1 in which said controlled device comprises a recorder device having a DC power supply and said one conductor is connected to the high side of said DC power supply.

3. A circuit as set forth in claim 1 in which said controlled device comprises a recorder device having a DC power supply and said one conductor is connected to the low side of said DC power supply.

4. A circuit as set forth in claim 1 in which said controlled device comprises a recorder device having an AC power supply and in which said one conductor is connected to one side of said AC power supply and the other two conductors are connected over recorder loads to the other side of said AC power supply.

5. A circuit as set forth in claim 1 in which said potential source includes input means connected to a voltage source, and output means for providing an output voltage which is related to the summated value of the voltage of said voltage source and the voltage at said reference point.

6. In a pulse initiator circuit for use with an electric meter comprising a potential source, detector means for providing signals which indicate the energy measured by said electric meter, an output cicuit including first and second semiconductor switching means, signal generating means connected to said detector means for alternately operating said first and second semiconductor switching means to the conducting state, a circuit reference point, a pulse responsive circuit including a separate power supply, a three-conductor output circuit for connecting the switching path of said first semiconductor to a first and second one of said conductors, and means connecting the switching path of said second semiconductor to said second and third terminals, and means connecting one side of said power supply to the second one of said conductors and the other side of said power supply over loads in said pulse responsive circuit to the first and third conductors, whereby the potential of said power supply appears in the switching path of the operated one of said first and second switching means, and means connecting said circuit reference point to the switching paths of the conducting one of said first and second switching means.

7. In a pulse initiator circuit for use with an electric meter comprising detector means for providing signals which indicate the energy measured by said meter, memory means connected to said detector means operable between a first and second state, a first and second signal output circuit for said memory means operable to provide signals indicating the state of said memory means, an output circuit including first and second semiconductor means, means connecting said first signal output circuit to operate said first semiconductor means between a conducting and nonconducting state and to provide a high impedance to said first semiconductor means in its nonconducting state, means connecting said second signal output circuit to operate said second semiconductor means between a conducting and nonconducting state and to provide a high impedance to said second semiconductor means in its nonconducting state, a common reference point for said first and second semiconductor, means connecting said reference point to be at the approximate voltage of the one of said first and second output semiconductor means which is in the conducting state, and a further output circuit including means for connecting the switching path of said first semiconductor means and the second semiconductor means to associated equipment.

8. In a pulse initiator circuit for use with an electric meter comprising detector means for providing signals which indicate the energy measured by said electric meter, memory means connected to said detector means operable between a first and a second state, a first and second signal circuit operable to provide signals indicating the state of said memory means, an output circuit including first and second semiconductor switching means, means connecting said first signal circuit to operate said first semiconductor switching means between a conducting and nonconducting state and to provide a high impedance to said first semiconductor switch means in its nonconducting state, means connecting said second signal circuit to operate said second semiconductor switching means between a conducting and nonconducting state and to provide a high impedance to said second semiconductor switching means in its nonconducting state, a common circuit reference point, means connecting said circuit reference point to said semiconductor switching means to be at the approximate voltage of the one of said first and second switching semiconductors which is in the conducting state, a three-conductor output circuit, means connecting the switching path of said first semiconductor to a first and second one of said conductors, and means connecting the switching path of said second semiconductor to said second and third terminals.

9. In a pulse initiator circuit for use with an electric meter having a rotating element for indicating measurements of consumed power comprising a potential source, detector means for providing signals which indicate the rotations of said rotating element, memory means connected to said power source operable between two states by said detector means including a first output circuit for providing a first signal whenever said memory means is in said first state, and a second output circuit for providing a second signal whenever said memory means is in said second state, output means including a first bridge rectifier circuit, a first semiconductor connected to conduct in response to said first signal from said first memory output circuit, means connecting said first output semiconductor across a first set of terminals of said bridge rectifier, a second bridge rectifier, a second output semiconductor connected to conduct in response to said second signal from said second memory output circuit, means connecting said second output semiconductor across a first set of terminals of said second bridge rectifier circuit, a three-conductor output circuit, means connecting a second set of terminals of said first bridge rectifier circuit to a first and second one of said conductors, means connecting a second set of terminals of said second bridge rectifier circuit to said second and third terminals, and means for connecting the voltage reference potential from a power supply over said second conductor and said first and second rectifier circuits to said first and second output semiconductors as a reference potential, a reference point connected to said potential source and switch means connecting the path of the conducting one of said first and second output semiconductors to said potential source, whereby said potential source is always referenced to the one of said output semiconductors which is in the conducting state.

10. A circuit as set forth in claim 9 in which said switch means comprise diode members connected between the emitter circuits of said first and second output semiconductors and said reference point.

11. A circuit as set forth in claim 9 in which said memory means comprise a flip-flop circuit including at least a first and second semiconductor, and which includes means for connecting the emitter circuit of said semiconductors to said reference point, and the collector circuit of said semiconductors to said potential source.

12. In a pulse initiator circuit for use with an electric meter having a rotating element for indicating measurements of consumed power comprising detector means for providing signals which indicate the rotations of said rotating element, a potential source, memory means connected to said potential source operable between two states including a first output circuit for providing a first signal whenever said memory means is in said first state, and a second output circuit for providing a second signal whenever said memory means is in said second state, first and second bridge rectifier circuits, a first and second semiconductor means, means for establishing a high impedance connection for said first memory output circuit to said first semiconductor whenever said first output semiconductor is turned off, and means connecting the input terminals of said first bridge rectifier to the output of said first output semiconductor, a second bridge rectifier, means for establishing a high impedance connection from said second memory output circuit and said second semiconductor whenever said second semiconductor is turned off, and means connecting the input terminals of said second bridge rectifier circuit to the output of said second semiconductor, a three-conductor output circuit, means for connecting the output terminals of said first bridge rectifier circuit to a first and second one of said conductors, means for connecting the output terminals of said second bridge rectifier circuit to said second and third conductors, and means for connecting a voltage reference potential from a further power supply over said second conductor to said first and second output semiconductors as a reference potential, and means selectively connecting the conducting path of the enabled one of said output semiconductors to said potential source.

13. In a pulse initiator circuit for use with an electric meter comprising a potential source, detector means for providing signals which indicate the energy measured by said meter, memory means connected to said detector means operable between a first and a second state, a first and second signal output circuit for said memory means operable to provide signals indicating the state of said memory means, an output circuit including first and second semiconductor switching means, means connecting said first signal output circuit to operate said first semiconductor switching means between a conducting and nonconducting state and to provide a high impedance to said first semiconductor switch means in its nonconducting state, means connecting said second signal output circuit to operate said second semiconductor switching means between a conducting and nonconducting state and to provide a high impedance to said second semiconductor switching means in its nonconducting state, a common reference point for said pulse initiator circuit connected to said potential source, diode means connecting said reference point to be at the approximate voltage of the one of said first and second output semiconductors which is in the conducting state, a three-conductor output circuit, means connecting the switching path of said first semiconductor to a first and second one of said conductors, means connecting the switching path of said second semiconductor to said second and third conductors, recorder means including a recording load, and a power supply, means connecting said second conductor to one side of said power supply, and means connecting the other side of said power supply over said recording load to said first and third conductors.

14. A circuit as set forth in claim 13 in which said memory means has its high side connected to the high side of said potential source, and its low side connected to said reference point.

15. A circuit as set forth in claim 13 in which said potential source comprises a potential coil on said electric meter and means for rectifying the current output of said potential coil.

* * * * *